(12) United States Patent
Kunert et al.

(10) Patent No.: US 7,174,745 B2
(45) Date of Patent: Feb. 13, 2007

(54) APPARATUS FOR PRESS-FORMING MOLTEN BODIES

(75) Inventors: Christian Kunert, Mainz (DE); Andreas Langsdorf, Ingelheim (DE); Norbert Greulich-Hickmann, Mainz (DE)

(73) Assignee: Schott AG, Mainz (DE)

( * ) Notice: Subject to any disclaimer, the term of this patent is extended or adjusted under 35 U.S.C. 154(b) by 369 days.

(21) Appl. No.: 10/212,593

(22) Filed: Aug. 5, 2002

(65) Prior Publication Data

US 2003/0046957 A1   Mar. 13, 2003

(30) Foreign Application Priority Data

Aug. 14, 2001   (DE) ................ 101 39 869

(51) Int. Cl.
C03B 40/00 (2006.01)
C03B 19/00 (2006.01)

(52) U.S. Cl. ............... 65/169; 65/182.2; 65/374.12

(58) Field of Classification Search ........... 65/169, 65/182.2, 374.12
See application file for complete search history.

(56) References Cited

U.S. PATENT DOCUMENTS 4,615,724 A * 10/1986 Fackelman .......... 65/182.2
5,066,320 A * 11/1991 Lehto et al. ............ 65/106
5,383,947 A * 1/1995 Montonen ............ 65/25.4
6,318,125 B1 * 11/2001 Diederen et al. ........ 65/102
2002/0194870 A1  12/2002 Greulich-Hickmann et al. .................. 65/25.1

FOREIGN PATENT DOCUMENTS

| DE | 24 58787 | 6/1976 |
| DE | 39 23 587 A1 | 1/1991 |
| DE | 101 46 510 | 12/2002 |
| JP | 60/235739 A | 11/1985 |
| JP | 2000154027 | 6/2000 |
| JP | 2000-302473 A | 10/2000 |
| JP | 2000302473 | 10/2000 |

* cited by examiner

*Primary Examiner*—Eric Hug
*Assistant Examiner*—Carlos Lopez
(74) *Attorney, Agent, or Firm*—Baker & Daniels LLP

(57) ABSTRACT

An apparatus for press-forming a molten gob made of meltable material, especially of glass or glass ceramics, into a body of specific shape with compression moulds which form with each other a form cavity for receiving the gob. The compression moulds consist at least in the zone of the forming surfaces of an open-pore material and the compression moulds are connected to a pressure gas source in order to produce a gas stream which emerges from the forming surfaces. The open-pore material of the forming surfaces the pores close to the forming surfaces are smaller than the pores remote from the forming surfaces.

11 Claims, No Drawings

APPARATUS FOR PRESS-FORMING MOLTEN BODIES

BACKGROUND OF THE INVENTION

The invention relates to an apparatus with which items can be formed of molten materials. Such materials predominantly concern glass or glass ceramics. Pressing is used as the forming method.

The pressing of glass has long been known as a forming variant. A piece of glass which is brought to a suitable temperature and has a sufficiently low viscosity at said temperature for deformation is usually brought between at least two tools which are then moved towards each other and enclose the gob in a space remaining between the two forming surfaces. The necessary force for deformation is applied to the tools. Usually, the force is maintained until the glass is sufficiently cooled in order to be removed from the tools without subsequent deformation.

During the pressing, the forming surfaces are in close contact with the glass to be deformed. As a result, even very fine structures on the forming tools appear on the newly formed surface of the glass part.

During the production of glass parts for optical purposes it is demanded, however, that the surface is free from any structures. Usually, such a surface on a component can only be achieved by grinding and polishing after the pressing. This usually entails high costs.

Class parts which cool off without contact to the forming tools show a so-called fire-polished surface without any damage. Since no forming surfaces form the glass during the solidification, it automatically assumes a shape which is determined by the surface tension which is virtually never the desired shape.

Tools are already known in which glass can be brought to the desired shape by a pressing process without damaging the fire-polished surface which Would be obtained during free cooling. The common aspect of these tools is that the forming surfaces consist of a permeable material and that prior to the introduction of the gob to be formed a fluid film is produced on the surfaces of the tool which prevents any contact between the gob and the tool surface and thus an damage to the surface of the gob. Said fluid film, and thus the contactless state, is usually also maintained during the pressing. Thus the Japanese published application JP 4-6114 describes a method in which the pressure rams are saturated with a liquid which evaporates during the pressing process and thus forms a glass film. This method comes with the disadvantage that the evaporation occurs in an uncontrolled way and an even glass film can thus only be produced with difficulty.

For the purposes of process security it is better to introduce the glass film in a direct and controllable way. For this purpose the forming surfaces are flowed through on the side averted from the glass with a gas or gas mixture and form a gas film between the tools and gob.

Press-forming of glass between forming surfaces covered with a gas film is described in the Japanese published application JP 2000-302473.

In pressing tools, the gas film introduced between the forming surface and glass part is compressed by the applied pressing force up to very small thicknesses of a few micrometers. In order to ensure that even through this very thin film no damage can be transmitted from the mould onto the glass part, the forming surfaces must have a very low roughness, so that no acute elevations over 5 µm are present on the surfaces. Moreover, the material on the forming surface facing the glass should neither impair the glass nor be attacked by the same.

Furthermore, in the case of short-term contact there should not be any damage to the forming tool.

Porous materials naturally show a certain roughness due to their pores. Since this roughness lies approximately in the magnitude of the pore size, it is necessary to use very fine-pored materials with pore sizes below 20 µm, preferably below 5 µm, for pressing tools. These materials lead to a high pressure loss for the gas flowing through the same.

If the flow resistance of the porous mould is high, it is necessary to work with relatively high supply gas pressures due to the thus caused pressure drop, which entails relatively high operating costs. There is furthermore the danger of a mould breakage because the pressure load acting on the mould is relatively high. On the other hand, it is known that a certain minimum differential pressure is the precondition for the even formation of the most stable possible gas film, which can be achieved in the most economical way by a mould base with relatively low values for gas permeability, but with the most even possible pore distribution over the surface.

SUMMARY OF THE INVENTION

The invention is based on the object of providing an apparatus for press-forming a molten item made of glass or glass ceramics or an other viscous or mouldable material and to form the same into a body of a specific shape, especially into an optical body such as an optical lens, namely by using press-forming tools whose surfaces facing the material to be formed is made up of open-pore material and are provided with a pressure-gas connection. Such an apparatus is to be configured in such a way that pressed parts with perfect surfaces can be produced, that the flow resistance of the surfaces made of the open-pore material and thus the operating costs are low and that the apparatus is simple and thus cost-effective in its arrangement.

This object is achieve by the by providing compression molds wherein the pores that are close to the forming surfaces are smaller than the pores remote from the forming surfaces.

DETAILED DESCRIPTION

The basic idea is thus to make the pores of the material very small which is situated in the direct vicinity of the forming surfaces, so that the surface roughness is low and thus a body of high surface quality can be produced. The thickness of the layer which is close to the forming surfaces should be limited to the required minimum thickness. This layer is then applied to a coarser lower layer which can be dimensioned in a sufficiently thick way in order to achieve the desired component strength because no substantial pressure loss occurs in the same for the gas flowing through the same. If necessary, more than two different materials or porosities can be combined; the lowermost layer can also be provided with channels and/or structures.

Apart from the porosity, the different layers can differ further. The layers can consist of different materials, so that it is possible to apply on an low-cost basic body a thin, fine-pore layer made of a material such as a precious metal which does not impair the glass and is not attacked itself by the glass or evaporating products therefrom. Virtually any pairings of materials are possible such as metal on metal, metal on ceramics or ceramics on metal. Layer systems with more than two layers are possible and are especially preferable in the case of a favorable combination with a porosity becoming finer towards the surface with a layer with favorable glass contact properties.

In practice there are several ways to realize the invention. Thus, the respective forming tool can be joined of layers of different thicknesses and pore sizes, because the layer which is provided with the forming surface has the smallest thickness and the smallest pores.

The respective pressing tool can also be formed of a porous base which has relatively large open pores as well as a layer which is applied onto the base.

In order to realize this there are may different approaches in accordance with the invention. A layer of material can be used which has porosity itself. Porous layer materials can thus be applied also in a larger thickness onto the supporting surface of the mould base because its cross-flow capabilities in the applied state are always ensured. It may also concern a material in which the pores are formed only during application.

It is also possible to apply a layer which is very thin and consists of a precious metal or a precious metal alloy. The precious metal can consist of a precious metal of the first or eighth subgroup of the periodic table of elements or of any random alloy of such elements among each other. This helps reduce or eliminate the problems involving the adherence or gluing of the material to be deformed to the tools. The precious metal coating is applied in such a thin way by means of a suitable process that the pore structure (porosity and pore size distribution) of the forming tool is maintained. Pore structures advantageous for forming materials are at 5 to 20% by volume of open pore volume at $d_{50}$ values for the pore diameter between 2 and 100 μm. Alternatively, the pore structure may have an open pore volume of 5 to 40% by volume for pores with a diameter of between 2 and 100 μm.

In a further development of the method in accordance with the invention an asymmetrical pore structure of the mould material is produced. This means that the side of the mould material facing the gob has significantly finer pore sizes (e.g. $d_{50}$ value is smaller by a factor of 2) than the stability-maintaining and coarser pore structure situated below the same. The pore size range on the glass contact side is in the range of between 0.5 and 50 μm ($d_{50}$ value) depending on the respective application. Three advantages are achieved by this arrangement:

1. The relatively fine pore structure of the side facing the gob produces substantially smaller mechanical surface faults even in the case of occasional glass contact.
2. The fine-pore layer does not have any stability effect; this is assumed by the coarse-porous layer. As a result of the low layer thickness of the fine-pore layer, the flow resistance in the mould is strongly reduced as compared with a mould consisting entirely of a fine-pore material, which is noticeable by a reduced pressure drop of the flowing gas and thus a lower susceptibility to disturbances of the process (e.g. by mould breakage) as well as a reduction of the operating costs.
3. The gas distribution by a fine-pore layer is more homogeneous at comparable porosity than in a coarser pore structure. This contributes towards a better surface quality of the thus produced glass product.

Principally, the asymmetrical mould materials in accordance with the invention can differ in such a way that the coarse and the fine structure either have the same (ceramics—ceramics or precious metal—precious metal) or different chemical compositions (preferably fine-pore precious metal layer on coarse-pore ceramics or coarse-pore base metal such as special steel)

The application of porosity-maintaining precious metal layers on the coarse-pore substrate can be made by the usual methods applicable for this purpose, namely sputtering, spraying, dipping or precipitation from solutions or suspensions.

The asymmetrical structures can be produced by a method employed usually for this purpose (e.g. by spraying or by joint sintering of two prefabricated mould bodies of different porosity with respectively adjusted geometry). The relevant aspect is only that the thickness of the fine-pore layer is not more than 20% of the total thickness of the asymmetrical structure. A porosity-maintaining coating made of precious metal for reducing the gluing tendency can be applied onto such a fine-pore layer (if it consists of a ceramic material or a base metal).

It is also possible in any kind of coating material to only produce the pores of the layer after its application on the supporting surface of the mould base, e.g. by gassing prior to start-up of the unit, i.e. before a gob is applied. Gas emerges from the pores of the mould base, and produces respectively fine bores in the layer due to the energy of the fine gas jets, which bores are maintained during the solidification of the layer, so that a gas bed can form between the surface of the layer and the gob.

In any case, both the material of the mould base as well as the material of the layer must meet all other requirements placed on the process. These materials must be especially heat-resistant.

It is thus possible with the method in accordance with the invention and with the apparatus in accordance with the invention to subject molten gobs to contact-free forming. Glass parts with a fire-polished surface can thus be produced in a continuous and cost-effective way. The method and apparatus are especially suitable for producing both optical lenses as well as planar bodies. The direct contact between the mould base and the gob is reliably prevented, so that the glass surface is entirely free from any faults. Even an occasional contact of the mould base and the gob, e.g. during the filling of the mould base with molten glass, has no serious consequences for the product quality and the service life of the mould base.

The invention claimed is:

1. An apparatus for press-forming a gob of molten glass or glass ceramics into a body of specific shape, said apparatus comprising:
   compression molds which form with each other a form cavity for receiving the gob, said molds having forming surfaces;
   the compression molds consisting essentially of an open-pore material at least in a zone of the forming surfaces;
   the compression molds being connected to a pressure gas source in order to produce a gas stream which emerges from the forming surfaces;
   in the open pore material of the forming surfaces the pores close to the forming surfaces being smaller than the pores remote from the forming surfaces;
   wherein the pores situated next to the forming surfaces have a diameter of 2 to 100 μm;
   wherein the material close to the forming surfaces has an open pore volume of 5 to 40% by volume.

2. The apparatus of claim 1 wherein:
   the forming surfaces of the compression molds are made up of layers which consist essentially of open-pore material;

the pores of the layers forming the forming surfaces are smaller than the pores of the other layers.

3. The apparatus of claim 2 wherein the layers forming the forming surfaces are applied onto a mold base by sputtering, spraying, dipping or precipitation from solutions or suspensions.

4. The apparatus of claim 3 wherein the individual said layers consist of different materials.

5. The apparatus of claim 2 wherein the individual said layers consist of different materials.

6. The apparatus of claim 5 wherein the layers forming the forming surfaces have a thickness in the range of 0.5 to 1.0 mm.

7. The apparatus of claim 4 wherein the layers forming the forming surfaces have a thickness in the range of 0.5 to 1.0 mm.

8. The apparatus of claim 3 wherein the layers forming the forming surfaces have a thickness in the range of 0.5 to 1.0 mm.

9. The apparatus of claim 2 wherein the layers forming the forming surfaces have a thickness in the range of 0.5 to 1.0 mm.

10. The apparatus of claim 1, wherein the material close to the forming surfaces has an open pore volume of 5 to 20% by volume.

11. The apparatus of claim 2 wherein the layers forming the forming surfaces consist essentially of a precious metal of the first or eighth subgroup of the periodic table of elements or of any random alloy of said elements among each other.

* * * * *